United States Patent [19]

Tomoeda

[11] 4,274,083
[45] Jun. 16, 1981

[54] APPARATUS FOR IDENTIFYING MOVING OBJECTS

[76] Inventor: Eiichi Tomoeda, 17-4-503, Sengoku 3-chome, Bunkyo-ku, Tokyo, Japan

[21] Appl. No.: 968,680

[22] Filed: Dec. 12, 1978

[30] Foreign Application Priority Data

Dec. 16, 1977 [JP] Japan .................................. 52-151477
May 26, 1978 [JP] Japan .................................. 53-63073

[51] Int. Cl.³ .......................... H04Q 9/00; G08G 1/00; G01S 9/56
[52] U.S. Cl. ................................. 340/171 R; 340/572; 340/38 L; 119/51 R
[58] Field of Search .............. 340/171 R, 152 T, 38 L, 340/572; 343/225, 228; 119/51

[56] References Cited

U.S. PATENT DOCUMENTS

| | | | |
|---|---|---|---|
| 3,541,995 | 11/1970 | Fathauer | 340/152 T |
| 3,772,668 | 11/1973 | Smith | 340/572 |
| 4,002,984 | 1/1977 | Streckenbach | 343/228 |
| 4,087,791 | 5/1978 | Lemberger | 340/152 T |
| 4,129,855 | 12/1978 | Rodrian | 340/152 T |

OTHER PUBLICATIONS

"Controlled Feeding" (no author), Instruction Book No. C11357E2/7801, Alfa–Laval Farm Equipment Co.

Primary Examiner—Donald J. Yusko
Attorney, Agent, or Firm—Spencer & Kaye

[57] ABSTRACT

Apparatus for identifying each of a plurality of moving objects including an electromagnetic field generator for radiating over a given area an electromagnetic field having a predetermined frequency, a plurality of moving object identification signal generators, each adapted for mounting on one of the movable objects and an identification receiver for receiving signals generated by transmitter units in the moving object identification signal generators. The identification receiver generates an output signal having a code corresponding to the frequency of the transmitter unit whose signal is being received.

6 Claims, 15 Drawing Figures

APPARATUS FOR IDENTIFYING MOVING OBJECTS

BACKGROUND OF THE INVENTION

The present invention relates to apparatus for identifying individual moving objects comprising elements of a group. In particular, the invention relates to apparatus for identifying individual animals such as dairy cows comprising a herd located within a limited area on a ranch.

In ranches on which large numbers of dairy cows are bred, many types of automated machines, such as automatic milkers and automatic feeding machines have been introduced and are widely used. For example, an automatic control feeding system is known in which each cow is fed individually according to its milk yield. The main components of this feeding system which controls the amount of feed received by a cow are a transponder, an interrogator, a feed dispenser having a hopper, and a control box. The transponder is an electronic device which is placed around the neck of a cow and is provided with dials on which the desired amount of feeding time is set for each of the cows being bred. However, this system does not permit identification of each cow. Further, the procedure for setting the dials on the transponder associated with a cow is rather troublesome.

If a large amount of data could be recorded for each individual cow, such data would be useful for future care of each cow and also for accumulating statistics relating to the entire herd.

Branding has conventionally been used for identifying dairy cows belonging to a specific group or herd. Identification of each individual cow within the group has been achieved by the use of a card called a "tab" which bears thereon symbols such as numbers and marks, a tab being fixed to an ear of each of the cows so that it can be seen by a man tending the herd. In order to identify an individual cow, a herdboy must approach the cow, read the contents of its tab and then record the necessary data. This is a rather cumbersome and time consuming procedure.

For example, during milking, in order to get a record of the yield of milk by each dairy cow, a herdboy must read the contents of the tab for that cow. It is apparent that when several hundred cows are involved, many hands are required for such an operation and it has not been practical to make the necessary records.

In the management of herds of dairy cows, it has been found that identification of each cow on a ranch is sufficient if each of the cows is identified at a specified limited area of the ranch. For example, when the dairy cows are moved from an area surrounded by a fence into another area, identification may be made easily at a gate connecting both areas by having a herdboy read the identifying tabs. In connection with milking the cows, the tabs may be confirmed at such a gate.

It is therefore an object of the present invention to provide an apparatus for automatically identifying a moving object, such as an animal, at a specified place.

SUMMARY OF THE INVENTION

The invention comprises apparatus for identifying each of a plurality of moving objects including an electromagnetic field generator for radiating over a given area an electromagnetic field having a predetermined frequency, a plurality of moving object identification signal generators each adapted for mounting on one of the movable objects and an identification receiver for receiving signals generated by transmitter units in the moving object identification signal generators. The identification receiver generates an output signal having a code corresponding to the frequency of the transmitter unit whose signal is being received.

BRIEF DESCRIPTION OF THE DRAWINGS

The invention will further be understood by reference to the figures of the accompanying drawings in which like reference numerals represent like parts in so far as possible in the several figures. In the figures.

DESCRIPTION OF THE PREFERRED EMBODIMENTS

Figure 1:
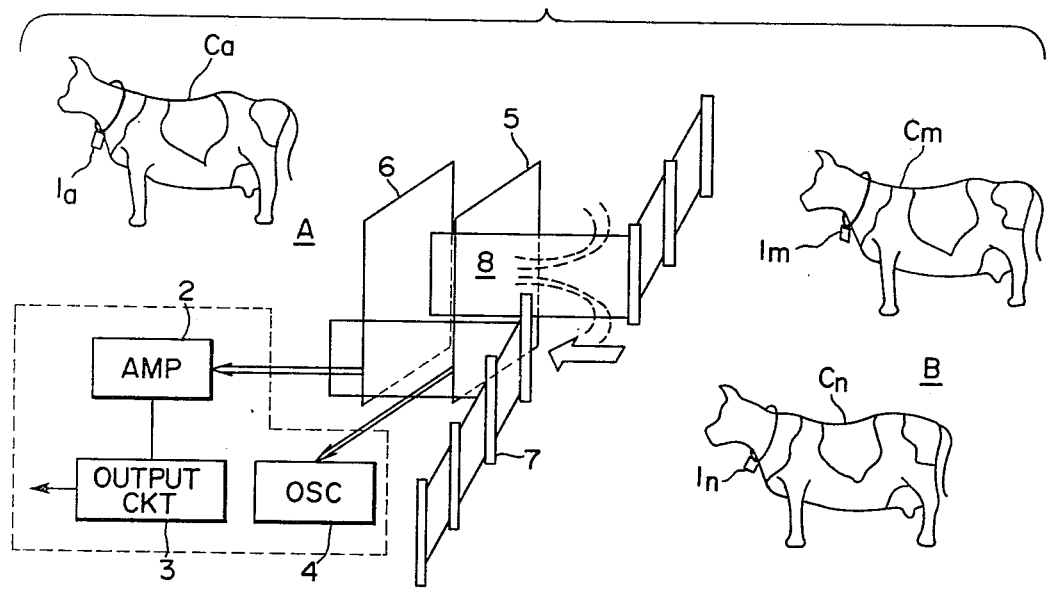
FIG. 1 is an explanatory view of an embodiment of an apparatus for identifying a moving object according to this invention.

FIG. 1 shows an area of a ranch divided into a part A and a part B by a fence 7. Many dairy cows are kept in the area B, and are driven through a gate 8 one at a time when a particular treatment is required. For example, each individual cow of the herd may be milked or some other operation performed at the gate 8, or in the area A after the cow passes through the gate 8. In a large ranch, it is usual to provide many rows of such gates arranged so that the cows are automatically driven one at a time through each of the gates.

Figure 2A:
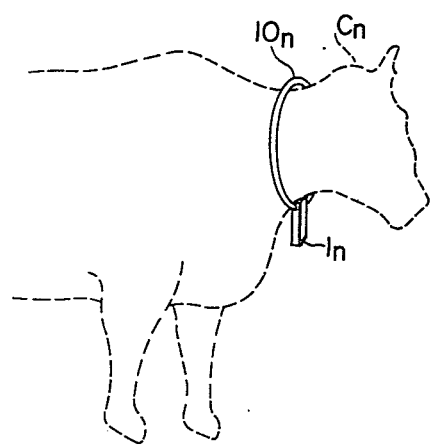
FIG. 2A shows a diagrammatical view of a dairy cow carrying a moving object identification signal generator around its neck.
Figure 2B:
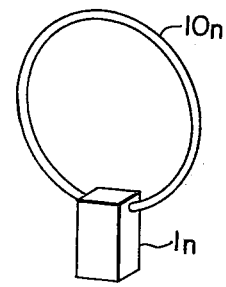
FIG. 2B is a perspective view of a signal generator of the type depicted in FIG. 2A.

Each of the dairy cows, Ca, Cb . . . Cn, which can be considered elements constituting a group, is provided with a moving object identification signal generator 1a, 1b... 1n which generates a coded electric signal associated with that generator. FIG. 2A shows a cow with such a generator 1n suspended around its neck and FIG. 2B shows a perspective view of the identification signal generator 1n.

Figure 3:
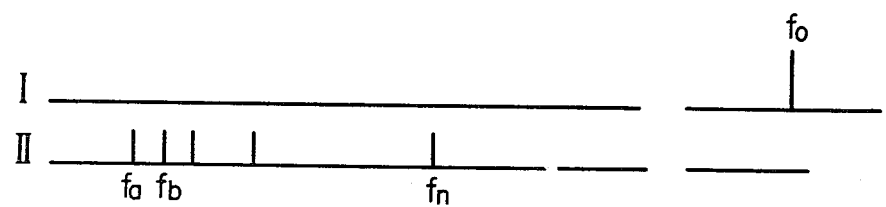
FIG. 3 is a graph showing the relation between the frequency of a position specifying electromagnetic field oscillator and the frequency of each moving object identification signal generator.
Figure 4:
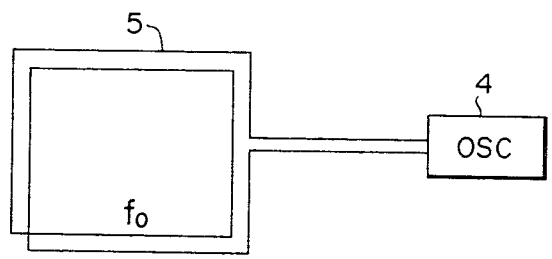
FIG. 4 is a circuit diagram of a position specifying electromagnetic field generator.

In accordance with a first embodiment, the gate area 8 is associated with an oscillator 4 which supplies a loop antenna 5 with an oscillation current at a frequency $f_o$ so as to form an electromagnetic field therearound, the electromagnetic field generator comprising oscillator 4 and antenna 5 being shown in FIG. 4. In this embodiment, the frequency of the voltage generated by the position specifying electromagnetic field oscillator 4 is set at 100 KHz and is unmodulated, as indicated by graph I of FIG. 3.

Figure 5:
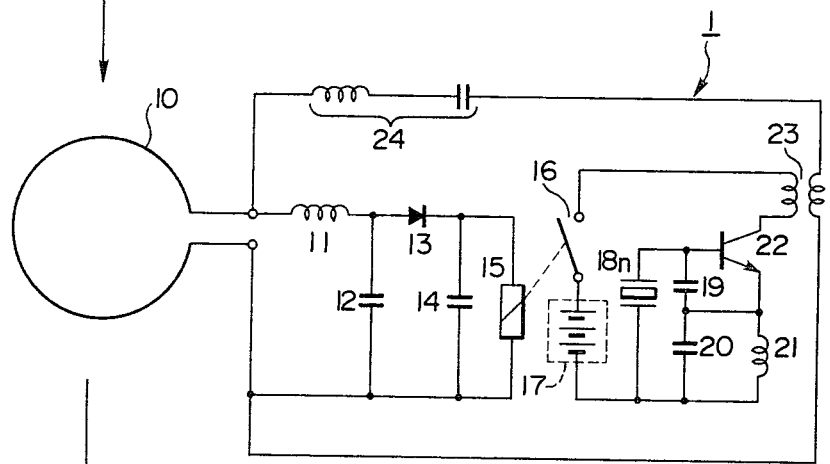
FIG. 5 is a circuit diagram showing a moving object identification signal generator.

As mentioned above, each of the cows in the group of cows Ca, Cb... Cn carrys around its respective neck a moving object identification signal generators 1a, 1b... 1n as shown in FIG. 2A. FIG. 5 shows one embodiment of such a moving object identification signal generator. In the generator 1 there is included a receiver unit, a timer, a transmitter unit and a battery.

The receiver unit, which includes an inductor 11 and a capacitor 12, is tuned to a frequency of 100 KHz so that when a cow reaches the gate area 8 a resonant voltage is generated across the capacitor 12 by the electromagnetic field generator shown in FIG. 4. This voltage is rectified by a diode 13 and produces a current which charges a capacitor 14. When the voltage across capacitor 14 reaches a predetermined magnitude, a timer 15 operates to close its contact 16 for a predetermined interval, for example, one second. In the meantime, power is supplied from the battery 17 to the transmitter unit through the contact 16.

The transmitter unit comprises an oscillator having a transistor 22, dividing capacitors 19, 20, a coil 21 and a crystal resonator 18n. The resonators used in the transmitter units for each of the individual cows are tuned to different frequencies so that each oscillator can generate its own oscillation frequency for a specific cow. According to the embodiment shown, the resonator frequencies are separated by 1 KHz and two cows may be identified, for example, by respective frequencies of $f_a=60$ KHz and $f_b=61$ KHz, as shown on graph II of FIG. 3.

Figure 6:
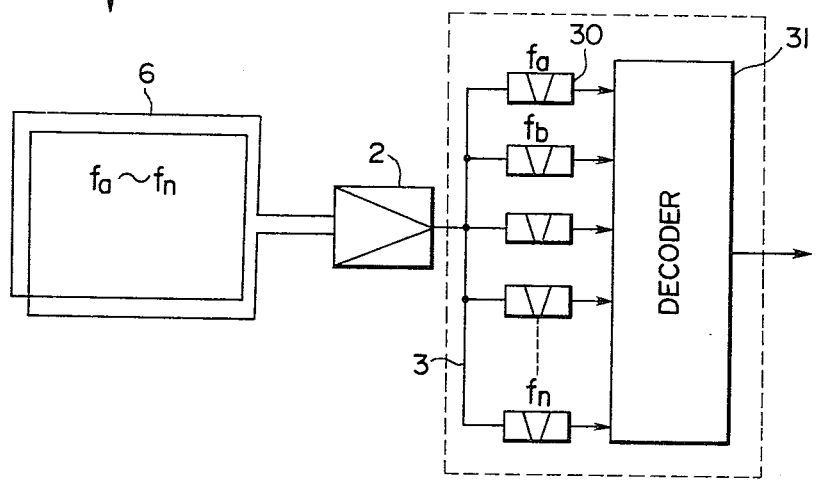
FIG. 6 is a circuit diagram showing an identification receiver.

When the timer contact 16 closes, the oscillator immediately begins to oscillate and its output is transmitted for the above-mentioned set time through a transformer 23, a filter 24 and a loop coil 10. The generated electromagnetic wave is then interrupted by a loop antenna 6 of an identification receiver which is provided in the gate area 8, as shown in FIG. 1. The electromagnetic wave is amplified by an amplifier 2 of the receiver shown in FIG. 6.

At the output side of the amplifier 2 there are connected in parallel a group of band-pass filters 30 and a decoder 31 comprising an output unit 3. The band-pass filters 30 have pass bands corresponding respectively to the frequencies $f_a, f_b ... f_n$ of the respective identification signal generators 1a, 1b... 1n, the output generated by each of the band-pass filters 30 identifying the corresponding moving object present in the gate area 8. In this embodiment, the output from the filter 30 is converted by a decoder 31 into a signal representing a number or coded format. Decoder 31 may comprise a plurality of TTL type SN74148 integrated circuits manufactured by Texas Instruments, Inc. to provide coded signals corresponding to each moving object.

Figure 7A:
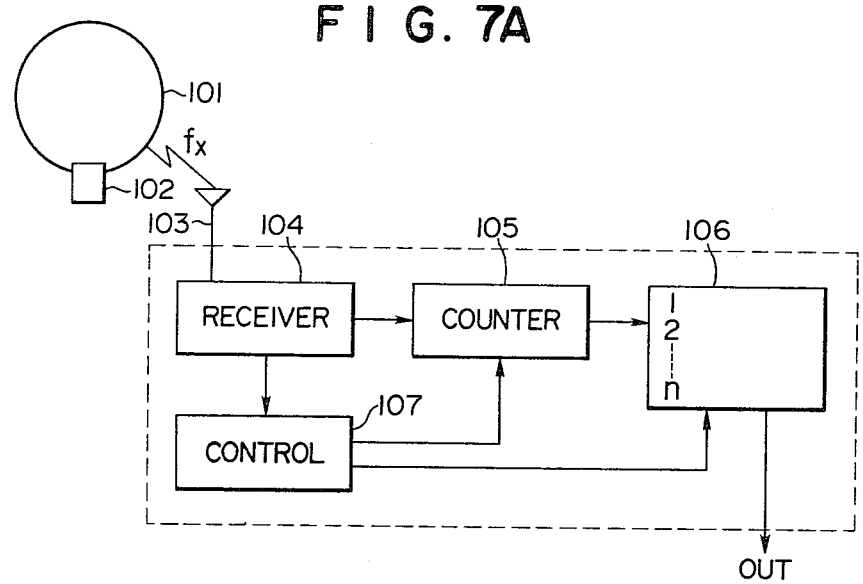
FIG. 7A is a block diagram for explaining a second embodiment of the apparatus for identifying a moving object according to the invention.
Figure 7B:
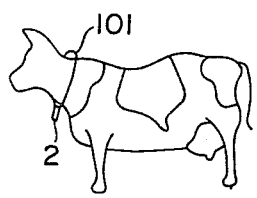
FIG. 7B is a diagrammatical view of a diary cow carrying a moving object identification signal generator around its neck.

FIG. 7A is a block diagram showing a second embodiment of the identifying apparatus of this invention. In this embodiment, the moving object identification signal generator is so constructed as to transmit an electromagnetic wave of a certain magnitude. When the signal generator arrives at a predetermined distance from the identification receiver, the receiver decodes the frequency received and generates an output.

Since the moving object identification signal generator is always energized in this embodiment, it consumes a relatively large amount of power. However, the apparatus is rather simple and the concentrated identification and management features provided make it advantageous for use over a limited period of time. In this embodiment, one moving object identification signal generator 102 is provided for each of the moving objects such as the dairy cows on a ranch, and their respective transmitting frequencies are determined by respective crystal resonators.

Figure 11:
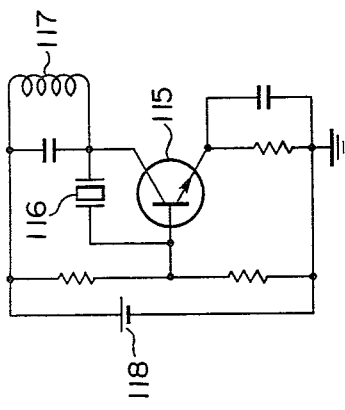
FIG. 11 is a circuit diagram of the identification signal generator used in the second embodiment shown in FIG. 7A.

FIG. 11 shows the circuit diagram for the moving object identification signal generator 102. In this circuit, an oscillator is directly connected across a power source 118 and is always in operation. Each of the crystal resonators has its own oscillation frequency in the vicinity of 78 MHz, the resonant frequencies of the crystals differing from each other by 2 KHz. Thus, 200 moving object identification signal generators 102, each timed 2 KHz apart, may be provided using a frequency range of 77.800 MHz to 78.200 MHz.

In the moving object identification signal generator 1 of the first embodiment described with reference to FIGS. 1 to 6, the ring 10 operates as both a transmitting and receiving antenna. However, in this embodiment, the electromagnetic wave is directly transmitted from a coil 117 (see FIG. 11) of the oscillator circuit, and therefore the ring 101 is merely used to attach the apparatus to the neck of the cow.

The identification receiver shown in FIG. 7A includes a receiver 104 which is connected to an input terminal of a receiving antenna 103 and a control circuit 107 to operate a counter circuit 105 for a predetermined interval when the output from the receiver 104 reaches a predetermined level.

Figure 13:
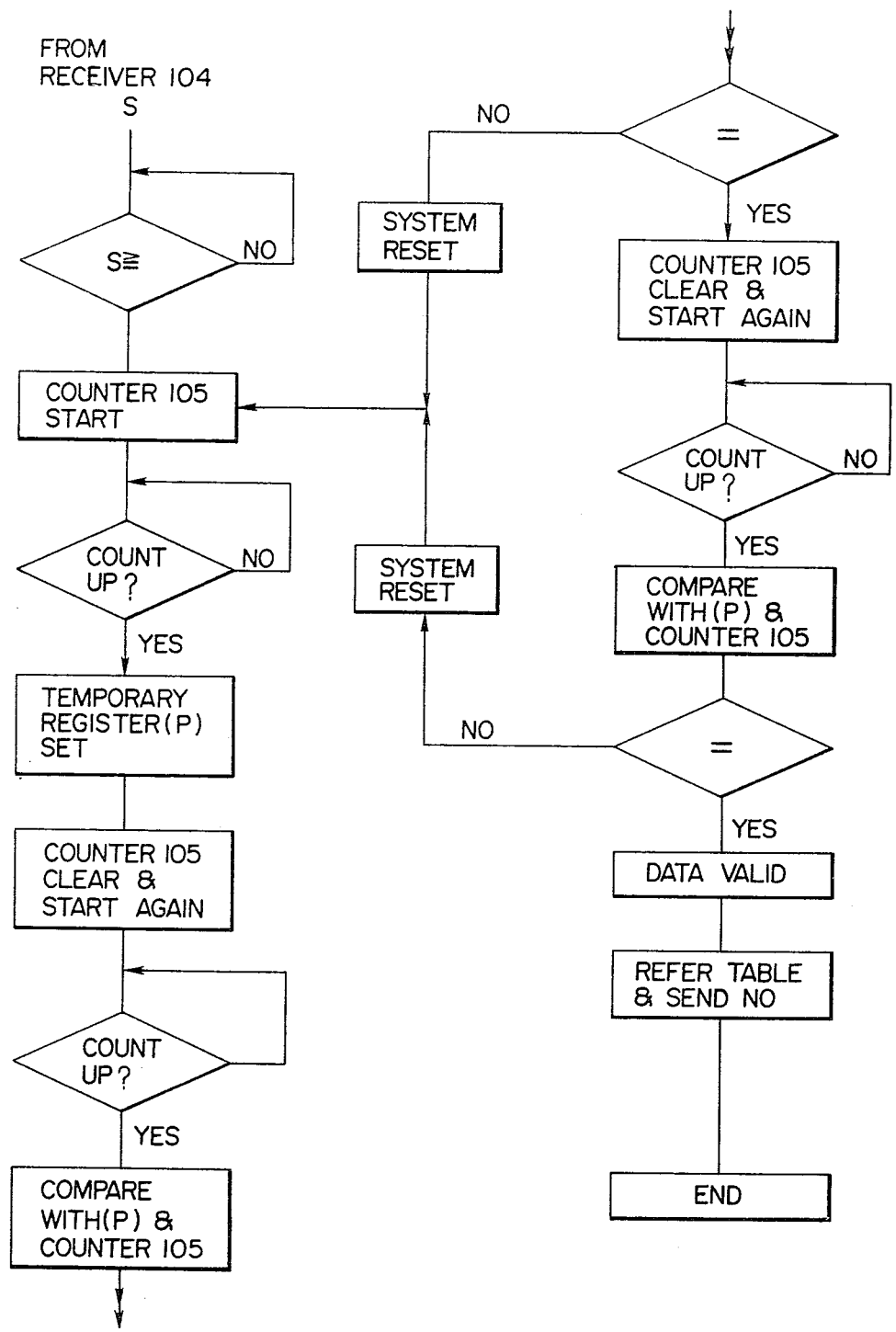
FIG. 13 is a flow sheet of the control system of this invention.

The control circuit 107 may be a one-chip CPU MC 6800 sold by Motorola, Inc. or an integrated circuit No. 8085 manufactured by Intel, Inc. may also be used. The operation of this control system is shown in FIG. 13 in the form of a flow diagram.

The receiver 104 includes a local oscillator having an oscillation frequency of 67.3 MHz determined by a crystal resonator. The receiver 104 mixes the 67.3 MHz oscillator frequency with the input frequency of 78 MHz to produce a difference frequency of 10.7 MHz. Similarly, input frequencies of 78.002 MHz and 78.004 MHz are converted respectively to 10702 KHz and 10704 KHz.

The receiver 104 further includes a circuit which measures the magnitude of the received signal, and when the output level exceeds a certain magnitude, which signifies approach of the identification signal generator to the antenna of the receiver, an output is generated. This feature may be achieved with an S meter or a squelch circuit.

The output from the S meter of receiver 104 is supplied to the control circuit 107, which then operates the counter 105. The counter 105 counts the output from the receiver 104 a number of times at selected intervals determined by the output from control circuit 107. In this counting, the least significant digit is rounded to the nearest whole number, and when sequential counts coincide, the counted value is transmitted to the output circuit 106.

The output circuit 106 includes a fixed memory table having stored therein addresses of memorized values corresponding to the count values of the output of receiver 104. The circuit 106 outputs an address corresponding to the output from the counter 105. For example, if the transmitted frequency from the signal generator carried by a dairy cow is 78.0 MHz, its count becomes 10700 and the output circuit 106 outputs a signal corresponding to the count 10700. With this signal, the dairy cow reaching the gate area is identified as, for example, dairy cow No. 1.

The operation of the above-mentioned second embodiment of the invention will be further explained with reference to the flow sheet of FIG. 13. When the output from the S meter of the receiver 104 exceeds a certain level, the counter 105 starts to count the frequency at the output of the receiver 104. This counted value is stored in a temporary register P of the output circuit 106. The counter 105 is then cleared and again starts to count. If the counting is in order, its counting is compared with the counted value already stored in the temporary register P. If the presently counted value and the stored counted value are different, the system is reset to re-start the new operation. If both counts are the same, the counter 105 is again cleared for further counting and the result compared with the count in the temporary register P. If they are equal, the counted frequency is identified as a specified moving object. This data is compared with the data in the table of the output circuit, so that the corresponding number in the table is outputted.

With this arrangement, it is possible to receive several signals simultaneously, but difficulty can be avoided by making the gate area narrower and selecting a higher receiving level.

Figure 8:
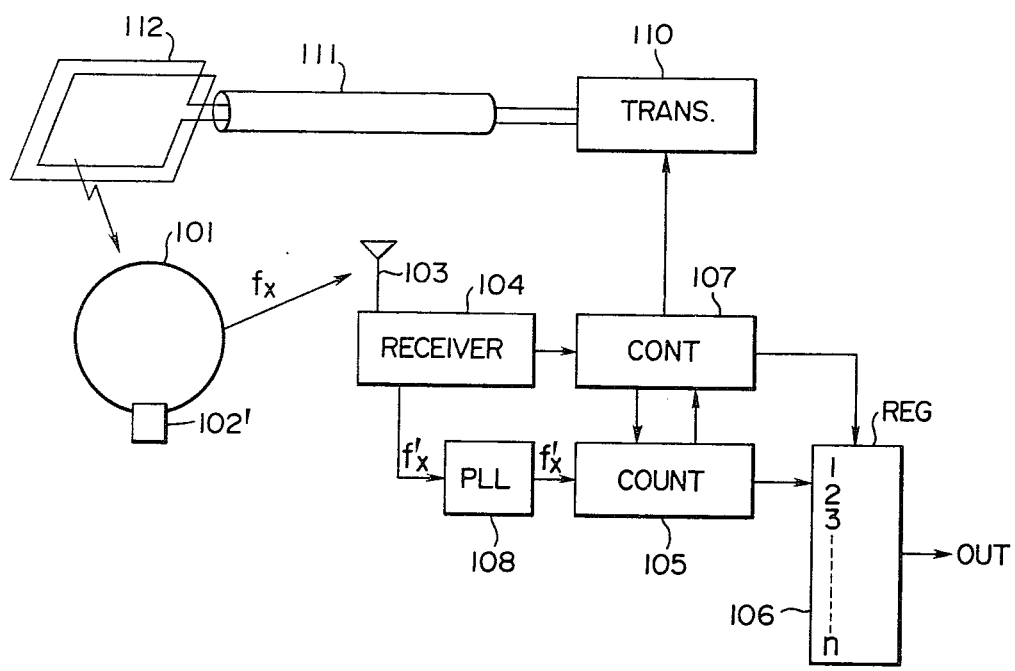
FIG. 8 is a block diagram showing a third embodiment of the invention.

FIG. 8 is a block diagram of a third embodiment of the identifying apparatus of this invention. In this apparatus, there is provided a transmitter 110 for specifying the area wherein the presence of a cow is to be detected. The identification signal generator 102' of this embodiment includes a receiver unit which can receive an output from the transmitter 110, and a transmitter unit which transmits its own frequency when the receiver unit receives the output. The identification receiver of this embodiment identifies a moving object entering the specified area by receiving the frequency from the transmitter unit.

Figure 12:
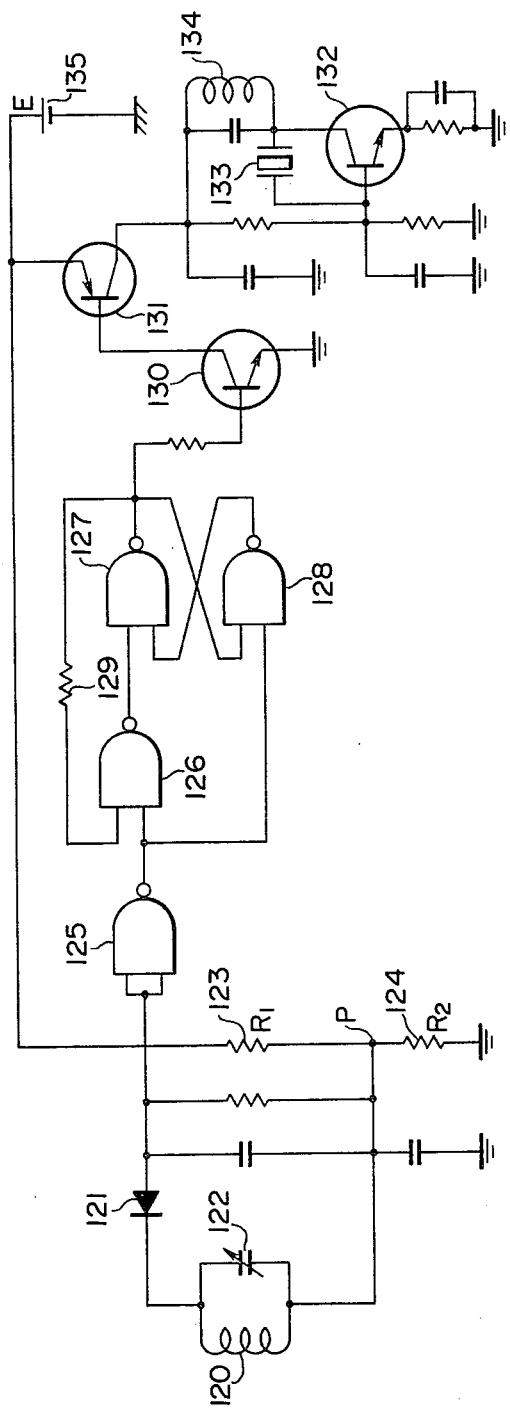
FIG. 12 is a circuit diagram of the identification signal generator including transmitter and receiver units used in the fourth embodiment of FIG. 10.

FIG. 12 shows the identification signal generator 102' used in this apparatus. Signal generator 102' comprises a resonant circuit for the receiver consisting of a coil 120 and a capacitor 122. The resonant frequency of this circuit corresponds to the transmitting frequency of the transmitter 110 which employs a loop coil 112 as a transmitting antenna, the coil 112 being coupled to the transmitter 110 by a coaxial cable 111. Since the transmitting frequency is selected to be 100 KHz, the resonant frequency of the resonant circuit is also set at 100 KHz. However, if a rod antenna is used, both frequencies may be approximately 50 MHz.

The voltage across resonant circuit 120, 122 is rectified by a diode 121. A voltage divider consisting of resistors 123 and 124 connected across battery 135 provides a biasing voltage at the node P to increase the sensitivity of the circuit. The node P of the resistors 123 and 124 is connected to the input terminal of a gate 125 through a resistor shown in FIG. 12. Gate 125 and gates 126, 127 and 128 are integrated circuits of the CMOS type and therefore consume only a small amount of power. Gates 127 and 128 form a flip-flop circuit, transistor 130 is driven by the flip-flop circuit and a transistor 131, which has a complementary polarity with respect to transistor 130 operates as a switch for the transmitter unit. The transmitter unit including a transistor 132 and a crystal resonator 133 for determining the transmitting frequency of the transmitter unit. The transmitter transmits via coil 134 while the transistor 131 is ON. As mentioned in connection with FIG. 11, a number of resonators 133 are provided, one for each of the transmitters.

The divided voltage $E \cdot R_2/(R_1+R_2)$ of battery 135 ($E=3V$) obtained from resistors 123 ($R_1=0.4$ megohm) and 124 ($R_2=1$ megohm) is kept at a high level of 2 V. When no electromagnetic wave is being received from the identification signal generator, the input of gate 125 is maintained at a high level, the output of gate 127 at a low level, transistors 130 and 131 are OFF and the transmitter unit is inoperative. When a signal is received from the identification signal generator, the voltage at the node P between the resistors 123 and 124 drops. Then, the output of the gate 125 is at a high level, the output of the gate 127 is also high, the transistors 130 and 131 are turned ON and the transmitter unit transmits a signal at its own transmitting frequency determined by the crystal resonator 133.

Figure 9:
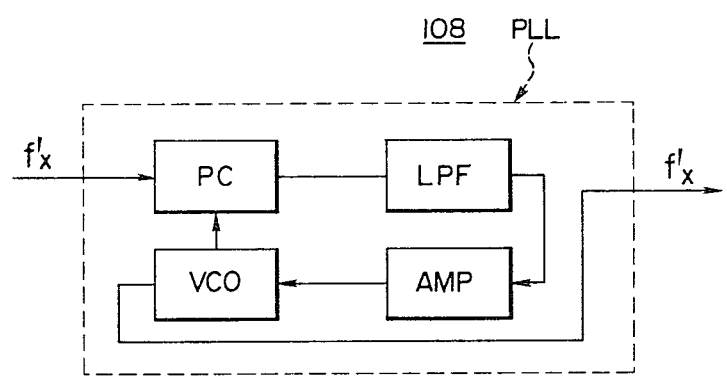
FIG. 9 is an explanatory view of a phase lock loop circuit used in the third embodiment of the invention shown in FIG. 8.

The construction of the receiver 104 of FIG. 8 is similar to that of FIG. 7a. When the received signal reaches a predetermined level, the signal is connected to the control circuit 107. The output frequency from the receiver 104 has a local oscillator frequency of 67.3 MHz, and is supplied to a phase locked loop circuit (PLL). FIG. 9 shows the construction of this PLL circuit.

The PLL circuit can be a monolithic signal conditioner NE560B sold by Signetics Corporation which comprises a voltage control oscillator, a phase comparator, an amplifier and a low-pass filter. In the embodiment of FIG. 8, the PLL circuit is used to obtain the same frequency as that of the input signal. When the PLL current receives a plurality of simultaneous signals, it transmits an output signal which coincides with the strongest signal among the plurality of received signals thereby stabilizing the output.

In FIG. 9, a phase comparator PC compares the phases of an input frequency f'x and a voltage controlled oscillator VCO to produce outputs having frequency components equal to the sum and difference frequencies of the input components. The difference component of the output is extracted by a low-pass filter LPF, amplified by an amplifier AMP and supplied to the voltage control oscillator VCO. The output of the PLL circuit 108 is coupled to the counter circuit 105.

The fundamental construction of the counter circuit 105 is the same as that already explained with reference to the second embodiment shown in FIG. 7a, but in this case it further includes the function of transmitting a plural count completion signal to the control circuit 107. To the control circuit 107 are supplied a signal showing that the amplitude of the signal from the receiver part exceeds a predetermined level, as well as a signal showing that the counter 105 has completed its count.

After receiving an output from the receiver part, the control circuit operates the counter 105 to count the output of the PLL circuit 108 several times. When the counter 105 outputs the coincidence with the control circuit 107, the circuit 107 transmits the contents of the counter 105 to the output circuit 106. The construction of the output circuit 106 has already been explained in connection with FIG. 8.

Figure 10:
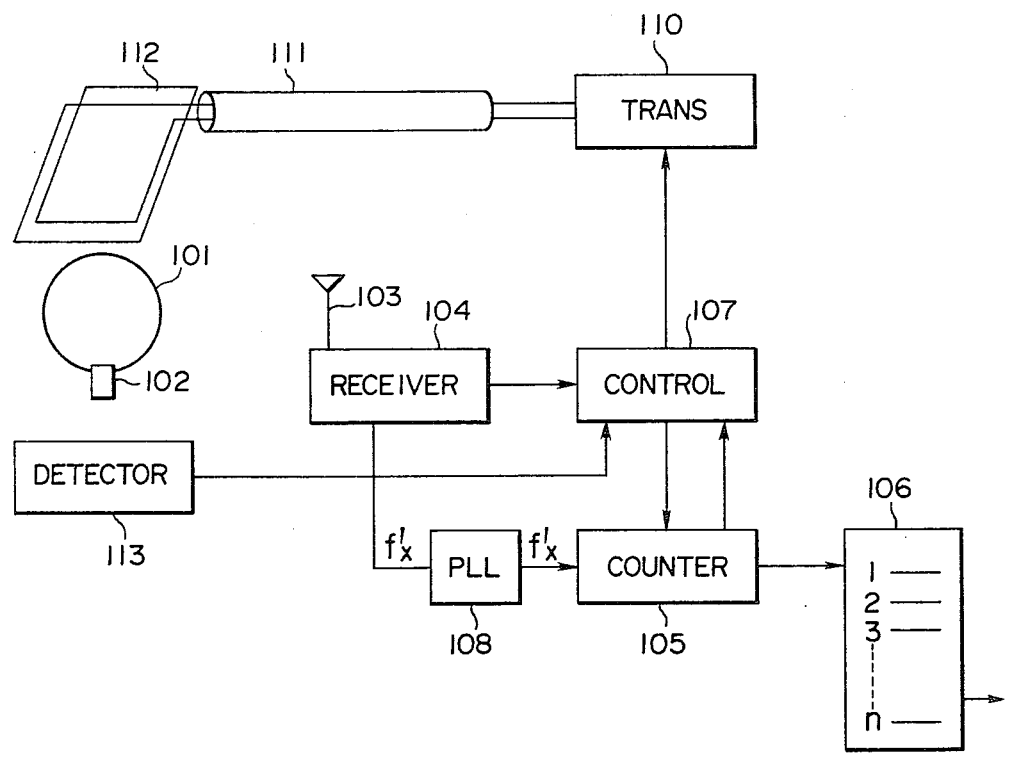
FIG. 10 is a block diagram showing a fourth embodiment of the invention.

FIG. 10 is a block diagram showing a fourth embodiment of the identifying apparatus of this invention. In this apparatus, the identification cycle is begun by the detection of the approach of a moving object, such as a dairy cow, which carries therewith an identification signal generator so that the battery of the identification signal generator may effectively be utilized. The construction of the identification signal generator 102 is the same as already explained with reference to FIG. 12.

In this embodiment, an approach detector circuit 113 is provided for detecting a cow located in a specified area. This detector circuit may easily be provided in the form of a mat switch which a cow steps on as it reaches the gate. However, if such a switch is not practical due to the fact that the gate is moist because there is water on the ground, other methods may be used. For example, light interruption utilizing a light transmitter and a light receiver, a detector utilizing light reflection, a thermal detector for thermally detecting radiation of a moving object, a Doppler radar using a Gunn diode, an ultrasonic wave or change of the inductance of a loop coil or interelectrode capacitance.

The basic construction of the transmitter 110 which energizes the counter 105, the output circuit 106, the identification signal generator is the same as explained with reference to FIG. 8.

In the embodiment of FIG. 10, the control circuit 107 energizes the transmitter 110 in response to an output from the approach detector 113. The identification signal generator 102 carried by the cow which is detected by the detector 113 transmits a signal immediately which is received by the identification receiver and identified thereby as mentioned above. The control circuit 107 stops transmission of the transmitter 110 by a counting completion signal from the counter circuit 105, so that one cycle of identification is closed. Detection of the next dairy cow by the detector 113 begins the next cycle of the operation.

As mentioned above, according to the embodiments of this application, identification of moving objects is made by receiving and counting the transmitting frequency which corresponds to each of the moving objects.

In particular, according to the first, third and fourth embodiments, the identification signal generator is made to transmit only for a very limited time when each of the moving objects is in the specified area, thereby decreasing the consumption of power. Therefore, the battery lasts for a relatively long time. In the apparatus of the fourth embodiment, the consumed power of the identification signal generator is about 2μA when it is not transmitting. Therefore, in the usual use of the generator, one battery lasts for about 5 to 10 years. According to the inventor's calculation, a battery can be used in the first and third embodiments for six months or more. Exhaustion of a battery can be ascertained easily since the generator stops generation of its signal at the gate area. An important advantage of the invention is that ranch work is simplified in that two or more simultaneous signals are not generated by different cows.

Further, according to the embodiments of this invention, the moving objects to be identified may be coded and management of the cows becomes possible by employing a code which is distinctive for each moving object, for example for recording milk yield, weight, etc. in the case of dairy cows. In particular, in the case of the fourth embodiment, the transmitter is operated by a signal from the approach detector which signals the identification signal generator. If there is no response, it will be understood that no object has approached the gate with an identification signal generator or that the signal generator is not in operation.

The control circuit to be used in the embodiments of the invention may be formed with a micro-processor. The order of operation and its order control may be made by operation of the terminal input board or by a fixed memory inputted beforehand.

According to the embodiments of the present invention, there may be recorded addresses or numbers corresponding to the transmitting frequencies at the output of the apparatus. It is not necessary to record these addresses in the order of increasing frequences, but, in the case of the dairy cows, in the order in which the cows approach the gate. Subsequent handling of the cows may be carried out with the numbers or codes. After recording with the numbers or codes, further treatment such as selection of the cows or recording of the condition of the cows may be made on the basis of such numbers and marks. It will be realized that this system is applicable to prior art control feeding systems described in this application and to similar moving objection identification systems. Further, an individual code may be formed in the form of the combination of a modulated signal and the generated frequency.

The invention has been described in detail with particular reference to the preferred embodiments thereof, but it will be understood that any variations and modifications can be effected within the spirit and scope of the invention.

What is claimed is:

1. Apparatus for identifying each of a plurality of moving objects comprising:
    an electromagnetic field generator for radiating over a given area an electromagnetic field having a predetermined frequency,
    a plurality of moving object identification signal generators, each adapted for mounting on one of said movable objects and comprising
    a receiver unit tuned to said predetermined frequency,
    a transmitter unit for transmitting an unmodulated signal at a specific frequency, said specific frequency identifying the particular object on which the signal generator is mounted, and
    a timer unit energized by said receiver unit upon receipt of said predetermined frequency, said timer unit then operating said transmitter unit for a predetermined interval which is the same for each of said plurality of signal generators, and
    identifying apparatus comprising
    a receiver for receiving the unmodulated signals generated by the transmitter units of said signal generators,
    a phase locked loop circuit coupled to the output of said receiver, said phase locked loop circuit stabilizing the output of said receiver by generating an output signal having a frequency coinciding with that of the signal of greatest magnitude among a plurality of signals at the output of said receiver, and a counter coupled to the outputs of said receiver and said phase locked loop circuit, said counter counting the output of said phase locked circuit when the output of said receiver exceeds a predetermined level to generate an output signal having a code corresponding to the specific frequency of the received signal of greatest magnitude.

2. Apparatus as defined by claim 1 wherein said electromagnetic field generator comprises an oscillator and a loop antenna, the strength of the electromagnetic field produced by said generator being sufficient to encompass a volume occupied by a single one of said moving objects.

3. Apparatus as defined by claim 1 wherein each of said moving object identification signal generators includes a transmitting and receiver antenna in the form of a collar for placing around the neck of an animal.

4. Apparatus for identifying moving objects comprising:

a plurality of moving object identification signal generators adapted for mounting on movable objects, each generator comprising a power source and a crystal resonator for generating a specific unmodulated frequency identifying the object on which the signal generator is mounted, and an identification receiver comprising a receiver for receiving the unmodulated signals transmitted by said moving object identification signal generators, a phase locked loop circuit coupled to the output of said receiver, said phase locked loop circuit stabilizing the output of said receiver by generating an output signal having a frequency coinciding with that of the signal of greatest magnitude among a plurality of signals at the output of said receiver, a frequency counter coupled to the output of said phase locked loop circuit for counting the output frequency thereof, a control circuit coupled to said receiver and said frequency counter for operating said frequency counter when the output of said receiver exceeds a predetermined value, and an output circuit coupled to the output of said frequency counter for generating a signal corresponding to the specific frequency of a moving object identification signal generator in response to the counted value of said counter, whereby when a moving object carrying an identification signal generator reaches a specified area, said moving object is identified by the frequency of said identification signal generator.

5. Apparatus for identifying a moving object comprising:

an electromagnetic field generator for radiating over a given area an electromagnetic field having a predetermined frequency, a plurality of moving object identification signal generators, each of said generators including:

a transmitter unit having a crystal resonator for determining the frequency thereof and for identifying said object, the signal generated by said transmitter unit having a specific unmodulated frequency, a receiver unit for driving said transmitter unit when said receiver unit receives a signal at said predetermined frequency from said electromagnetic field generator which exceeds a predetermined level, and a power source for supplying said transmitter and receiver units with power, and an identification receiver comprising a receiver part for receiving the output signals from said plurality of moving object identification signal generators, a phase locked loop circuit coupled to the output of said receiver, said phase locked loop circuit stabilizing the output of said receiver by generating an output signal having a frequency coinciding with that of the signal of the greatest magnitude among a plurality of signals at the output of said receiver, a frequency counter coupled to the output of said phase locked loop circuit for counting the output frequency thereof, a control circuit coupled to said receiver and said frequency counter for operating said frequency counter for a predetermined interval after said receiver part has received an output from said moving object identification signal generator, and an output circuit coupled to the output of said frequency counter for generating a signal corresponding to the specific frequency of a moving object identification signal generator in response to the counted value of said counter.

6. Apparatus as defined by claim 5 which further comprises an approach detector coupled to said control circuit, said approach detector generating a signal when a moving object carrying therewith a moving object identification signal generator is in the vicinity thereof thereby actuating said identification receiver.

* * * * *